US007943220B1

(12) United States Patent
Williams

(10) Patent No.: US 7,943,220 B1
(45) Date of Patent: May 17, 2011

(54) LAY-FLAT ARCHIVAL POLYESTER POCKET

(75) Inventor: Patrick R. Williams, DeRidder, LA (US)

(73) Assignee: Louisiana Binding Service, Inc., DeRidder, LA (US)

( * ) Notice: Subject to any disclaimer, the term of this patent is extended or adjusted under 35 U.S.C. 154(b) by 0 days.

(21) Appl. No.: 11/426,855

(22) Filed: Jun. 27, 2006

Related U.S. Application Data

(60) Provisional application No. 60/595,373, filed on Jun. 27, 2005.

(51) Int. Cl.

| | |
|---|---|
| ***B32B 27/02*** | (2006.01) |
| ***B32B 27/06*** | (2006.01) |
| ***B32B 27/12*** | (2006.01) |
| ***B32B 27/36*** | (2006.01) |
| ***B65D 85/00*** | (2006.01) |
| ***B65D 85/48*** | (2006.01) |

(52) U.S. Cl. ..................... 428/36.2; 428/34.1; 428/35.2; 428/35.4; 428/35.7; 428/190; 428/193; 206/215; 206/449

(58) Field of Classification Search ................. 428/34.1, 428/35.2, 35.4, 35.7, 36.1, 36.2, 36.6, 121, 428/123, 189, 190, 192, 193; 206/215, 449, 206/472; 229/67.1, 67.4
See application file for complete search history.

(56) References Cited

U.S. PATENT DOCUMENTS 3,776,644 A * 12/1973 Baker ............................... 401/7
5,451,437 A * 9/1995 Insley et al. .................. 428/35.2
6,810,554 B2 * 11/2004 McKay ........................... 15/228

* cited by examiner

*Primary Examiner* — Walter B Aughenbaugh
(74) *Attorney, Agent, or Firm* — Michael L. Greenberg, Esq.; Greenberg & Lieberman, LLC

(57) ABSTRACT

A polyester pocket with a clear front and back is provided. A spun-bonded polyester strip is positioned near the open end of the polyester pocket to prevent atmospheric contaminants from entering the polyester pocket. The spun-bonded polyester strip also allows the polyester pocket to lay flat when multiple polyester pockets are stacked upon one another. The thickness of the spun-bonded polyester can be made to roughly correspond to the thickness of documents inserted into the polyester pocket.

1 Claim, 2 Drawing Sheets

LAY-FLAT ARCHIVAL POLYESTER POCKET

FIELD OF THE INVENTION

The present invention is an archival polyester pocket for document storage and preservation. More particularly, the present invention is a polyester pocket that is adapted to allow multiple polyester pockets to lay flat upon one another for storage purposes.

BACKGROUND OF THE INVENTION

Storage of documents for archival purposes is often accomplished by using a conventional polyester pocket. A conventional polyester pocket is essentially two sheets of polyester that are clear and rather smooth that are bound to one another, such that the top edge of the two sheets of polyester are bound. The right edge of the two sheets of polyester are bound and the bottom edge of the two sheets of polyester are bound.

The left edge of the two sheets of polyester is typically left open, so that the user can insert a document between the two sheets of polyester. Once a document has been inserted between the two sheets of polyester, the left side of the two sheets of polyester is typically bound in a notebook for archival purposes. The two sheets of polyester are typically wider than the document to be placed within them. For example, a typical polyester pocket would receive a document that is 8½ inches wide, and in such case, the polyester pocket might be an extra inch or inch and a half wide beyond the 8½ inches, so that there is a margin or an area through which holes for binding could be placed, such that the holes would miss the document enclosed in the polyester pocket. It is not uncommon for multiple polyester pockets to be stacked one upon another, similar to pages in a book, so that notebooks full of documents to be archived can be maintained.

Unfortunately, there are several drawbacks to using conventional polyester pockets. First, conventional polyester pockets really have no means of sealing themselves once a document is placed therein. While the top, right and bottom sides of a conventional polyester pocket are sealed, typically, the left side remains unsealed, and only the static cling of the two sheets of polyester making up the polyester pocket provide a pseudo-seal to pollutants that would occur in the air and damage a document contained within the pocket. Thus, there is a need for a polyester pocket for archival purposes that provides a better seal to the environment than simply the pseudo-seal created between two clear sheets of polyester making up an archival polyester pocket.

Moreover, conventional polyester pockets, when stacked upon one another, do not lay flat. Laying flat would mean that if the user would stack 50 conventional polyester pockets one on top of another, with documents inserted in each polyester pocket, the stack of polyester pockets would be completely vertical. Unfortunately, conventional polyester pockets, because they are wider than the documents contained therein, are actually thicker in the portion of the polyester pocket that holds the document, and thinner on the left margin of the polyester pockets that do not hold the document, and merely represent the two sheets of the polyester pocket touching one another.

The concept of laying flat is important because if 50 or 100 or 200 conventional polyester pockets are stacked upon one another and placed in a notebook, the notebook will not sit properly, or be able to be placed in a book shelf properly, because it will not completely close. The notebook will not completely close because the left margins of the polyester pockets do not take up as much girth as the majority of the polyester pockets. For example, a user viewing conventional polyester pockets with documents inserted in each one of the polyester pockets would see a stack of polyester pockets upon one another, arcing to the left or arcing to the right. Arcing to the left would occur if the margin of the polyester pockets not containing a document is on the left. Arcing to the right would occur if the margin where the two sheets of polyester for each pocket not containing a document are to the right.

In short, there is a need for a polyester pocket that will not arc to the right or arc to the left when stacked upon itself multiple times. Restated, there is a need for a polyester pocket that will lay flat when 100 of the polyester pockets or 200 of the polyester pockets are stacked upon one another, so that when placed in a notebook, the notebook will be able to actually close and fit in a book shelf, as opposed to remaining open because the outside margin of the polyester pockets has greater girth than the inside margin of the polyester pockets.

Moreover, polyester pockets themselves are made of thin layers of polyester joined together. When bound in a notebook or other storage medium, the rings of the notebook can put stress on the holes made in the polyester pockets to retain them. There is a need for a polyester pocket that has a mechanism of reinforcement, so that when the polyester pockets are flipped on the rings of a conventional notebook, the polyester pockets are not susceptible to ripping from the holes that help to hold the polyester pockets on the rings of the notebook.

Furthermore, conventional standards for archiving paper only favor archival with polyester. While vinyl and other materials can be used to archive documents, only polyester is recognized as the safest material to be used.

U.S. Pat. No. 6,742,812, issued to Ramella et al on Jun. 1, 2004, shows a vinyl pocket for storage pages that is heat sealed around its edges. Unlike the present invention, Ramella et al's device is made of vinyl, not polyester. Moreover, unlike the present invention, Ramella et al's device is heat sealed, so that should the user want to remove a document from its protective pocket, the heat sealing prevents easy removal. Additionally, the heat sealing of Ramella et al's device could potentially damage a document enclosed within the vinyl pocket because the heat for melting vinyl could adhere to the document. Thus, there is a need for an improved polyester pocket for holding documents that will not interact with the document, or fuse to the document, but merely protect it, allow it to lay flat, prevent atmospheric pollutants from encountering the document while it is in the polyester pocket and be made of purely polyester, because polyester is the only substance that is highly recommended for storage of documents.

SUMMARY OF THE INVENTION

A polyester pocket is disclosed for the encapsulation of documents specifically designed to facilitate paper documents that are aging, fragile and in need of permanent, long-term storage. The present invention is made of two clear sheets of polyester that have a smooth surface with high gloss, good dimensional stability, natural static cling and excellent flatness. A spun-bonded polyester edge is positioned near the open end of the polyester pocket of the present invention. The spun-bonded polyester is approximately the same thickness as the document to be encapsulated within the two clear sheets of polyester of the present invention. The spun-bonded polyester creates an atmospheric seal for the documents held within the pocket of the present invention, and moreover, allows the pocket of the present invention to be relatively flat, such that an edge of the present invention that does not hold a document has a similar thickness to the rest of the present invention that actually does hold the document, so that 50 or 100 or more duplicates of the present invention can be stacked upon one another and an arcing effect to the left or to the right will not occur because each of the present invention's is relatively planer, even when a document is placed within it.

DETAILED DESCRIPTION OF THE PREFERRED EMBODIMENT(S)

Figure 1:
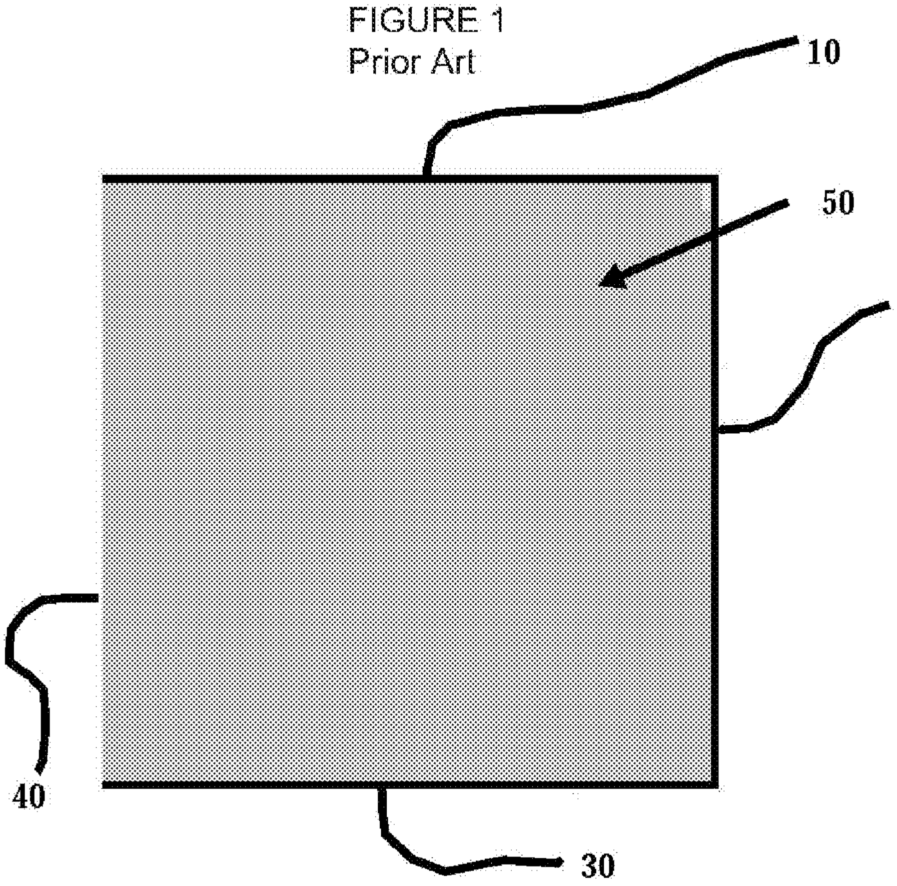
FIGURE 1 Prior Art
FIG. 1 shows a front view of the relevant art.

FIG. 1 shows a front view of the relevant art. There is a top end (10), a right end (20) and a bottom end (30), which are sealed, meaning that a sheet placed within top end (10), right end (20) and bottom end (30) cannot move past top end (10), right end (20) and bottom end (30). Left end (40) is open and serves as the opening through which a document to be stored in the relevant art would be inserted.

Figure 2:
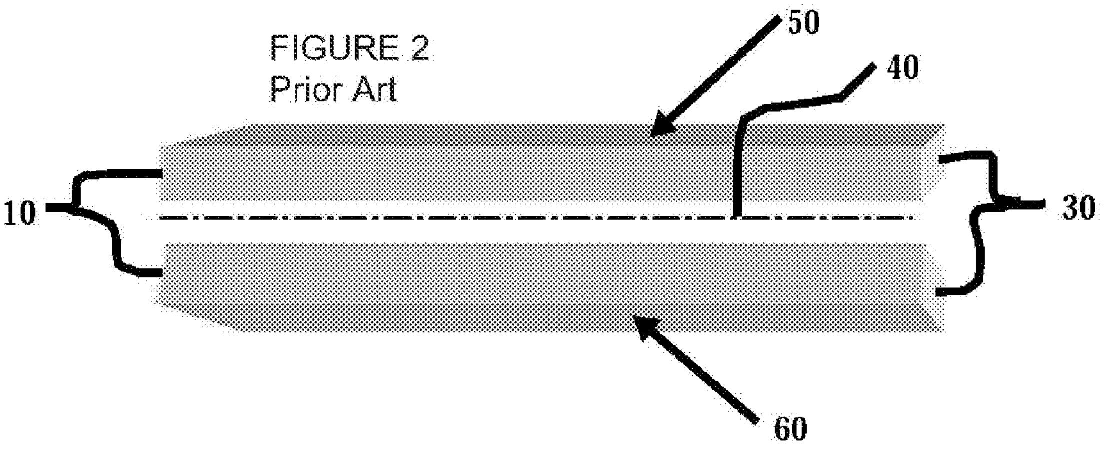
FIGURE 2 Prior Art
FIG. 2 shows a side view of the relevant art.

As shown in FIG. 2, top sheet of clear polyester (50) and bottom sheet of clear polyester (60), because they are bound together at top end (10), right end (20) and bottom end (30), allow a document to only enter between top sheet of clear polyester (50) and bottom sheet of clear polyester (60) via left end (40). As shown in FIG. 2, top sheet of clear polyester (50) is angling down and bottom sheet of clear polyester (60) is angling up. The angling of top sheet of clear polyester (50) and bottom sheet of clear polyester (60) is caused by a document that has been inserted between top sheet of clear polyester (50) and bottom sheet of clear polyester (60). Because top end (10) and bottom end (30) are longer than the width of an inserted document, top sheet of clear polyester (50) is not supported by the inserted document near left end (40).

Similarly, bottom sheet of clear polyester (60) is not supported near left end (40) by an inserted document. Because top sheet of clear polyester (50) and bottom sheet of clear polyester (60) angle toward one another near left end (40) when a document has been inserted between them, the relevant art cannot be said to lay flat. The angling of top sheet of clear polyester (50) and bottom sheet of clear polyester (60) means that top sheet of clear polyester (50) and bottom sheet of clear polyester (60) are not completely in the horizontal plane, and thus, when multiple copies of the relevant art are stacked upon one another, an arcing will occur towards left end (40) because the document within the relevant is not supporting top sheet of clear polyester (50) and bottom sheet of clear polyester (60) near left end (40).

Furthermore, although left end (40) might partially seal as top sheet of clear polyester (50) and bottom sheet of clear polyester (60) are attracted towards one another via static cling, there is no real seal on left end (40). Essentially, left end (40) is open to atmospheric pollutants that are undesirable and that could contaminate an inserted document.

Figure 3:
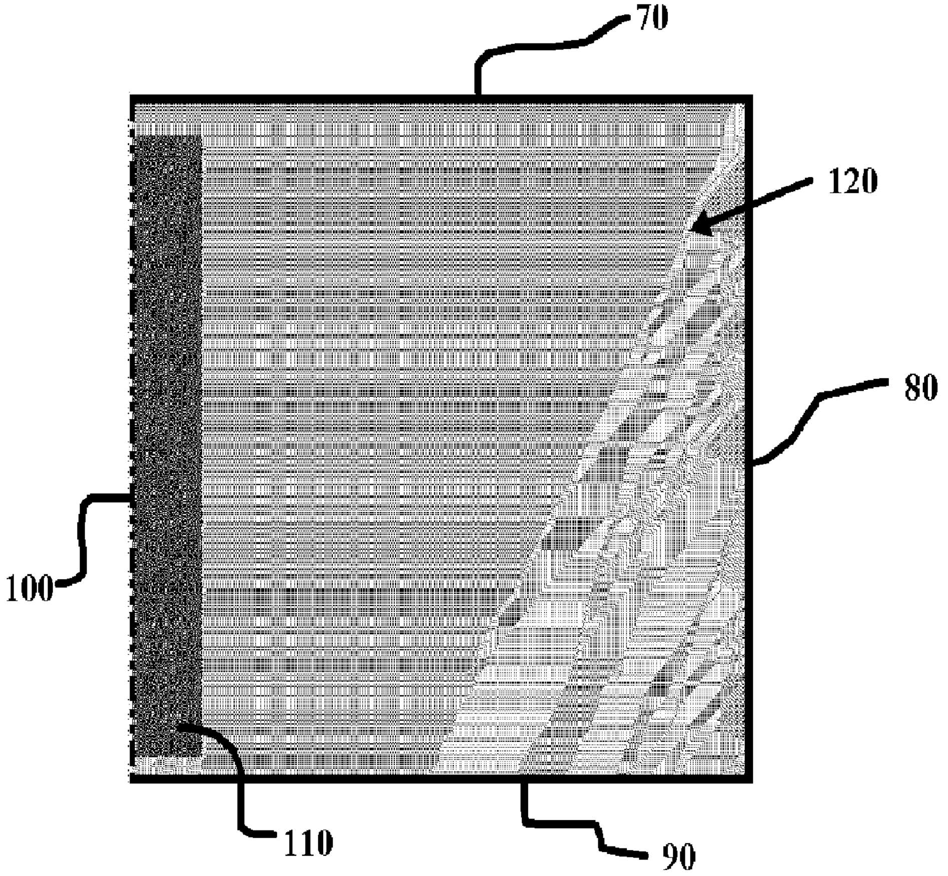
FIG. 3 shows a front view of the present invention.

FIG. 3 shows the present invention. The present invention, much like the relevant art shown in FIG. 1 has an upper end (70), an outer end (80) and a lower end (90) that are closed. Open end (100) is opened to receive a document to be held between upper end (70), outer end (80) and lower end (90). Of particular note is spun-bonded polyester (110) that is disposed near open end (100).

Figure 4:
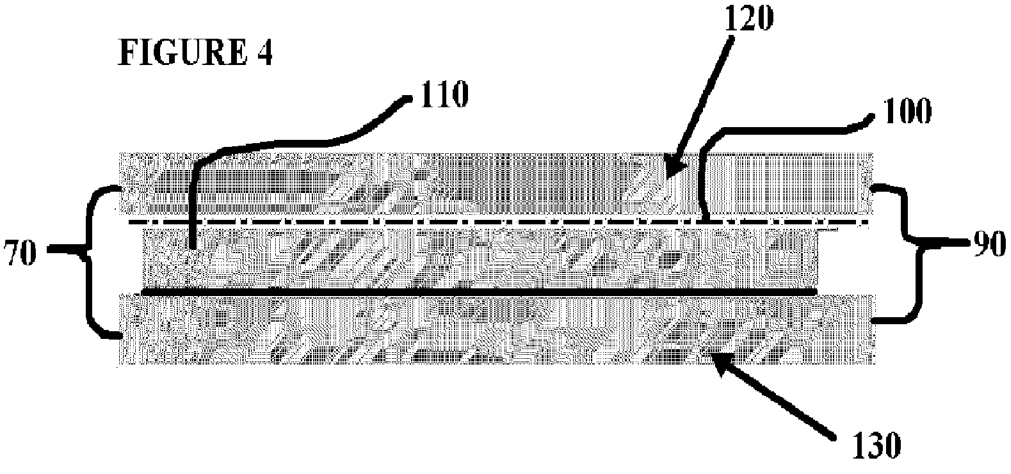
FIG. 4 shows a side view of the present invention.

The spun-bonded polyester (110), as shown in FIG. 4, is adhered to lower sheet of clear polyester (130). Once a document has been inserted between upper sheet of clear polyester (120) and lower sheet of clear polyester (130) via opened end (100), spun-bonded polyester (110) will, via static cling, form an atmospheric seal to prevent pollutants from entering via open end (100). In short, spun-bonded polyester (110), via static cling, forms such a seal with upper sheet of clear polyester (120).

FIG. 4 also shows upper sheet of clear polyester (120) and lower sheet of clear polyester (130) unangled when compared to top sheet of clear polyester (50) and bottom sheet of clear polyester (60). Upper sheet of clear polyester (120) and lower sheet of clear polyester (130) are not angled because spun-bonded polyester (110) has the approximate same thickness as an inserted document. Thus, while the length of upper end (70) and lower end (90) is longer than the width of an inserted document, the spun-bonded polyester (110) supports upper sheet of clear polyester (120) and lower sheet of clear polyester (130), so that they remain equidistant, as if the inserted document extends all the way to open end (100). Thus, the spun-bonded polyester (110) not only creates an atmospheric seal to prevent pollutants from entering the present invention and damaging an inserted document, but moreover, spun-bonded polyester (110) allows the present invention to truly lay flat, such that multiple present inventions could be stacked one upon another and arcing toward open end (100) or toward outer end (80) would not occur.

The present invention has upper sheet of clear polyester (120) and lower sheet of clear polyester (130) made of various thicknesses of polyester. While upper sheet of clear polyester (120) and lower sheet of clear polyester (130) will always be of the same thickness when they are mated together to form a pocket, various pockets are contemplated, such that more than just the 3 ml thickness is available. While the relevant art typically has top sheet of clear polyester (50) and bottom sheet of clear polyester (60) in a 3 ml thickness, the present invention can have upper sheet of clear polyester (120) and lower sheet of clear polyester (130) in thicknesses of 2 ml or even 1.5 ml. A 1.5 ml thickness is relatively flimsy and normally, would be difficult to maneuver to insert a document therein, and moreover, would not have much structural integrity.

However, in the present invention, spun-bonded polyester (110) functions to provide extra support for upper sheet of clear polyester (120) and lower sheet of clear polyester (130). Thus, because of spun-bonded polyester (110), thinner versions of upper sheet of clear polyester (120) and of lower sheet of clear polyester (130) can be offered and are functional, when compared with the relevant art.

What is claimed is:

1. A polyester pocket, comprising:
a top layer of polyester;
a bottom layer of polyester, non-unitary with respect to said top layer, adhered to said top layer of polyester, said top layer of polyester and said bottom layer of polyester forming a pocket;
a document within said pocket;
a spun-bonded polyester layer, adhered to said top layer of polyester or said bottom layer of polyester;
said spun-bonded polyester layer is positioned at an open end of said pocket such that said spun-bonded polyester layer is configured to create an atmospheric seal for document within said pocket;
said spun-bonded polyester layer having the same thickness as said document; and
said top layer of polyester, said bottom layer of polyester, said spun-bonded polyester layer and said document forming a flat pocket;
said document inserted between said top layer of polyester and said bottom layer of polyester via said open end such that said spun-bonded polyester forms an atmospheric seal via static cling to prevent pollutants from entering said open end and also to allow for flatness.

* * * * *